United States Patent [19]

Andersen et al.

[11] Patent Number: 5,011,358

[45] Date of Patent: Apr. 30, 1991

[54] HEIGHT INDICATOR FOR A FORK LIFT TRUCK

[76] Inventors: Eric T. Andersen; Edward A. Andersen, both of Rte. 1, Box 138A, Barboursville, Va. 22923

[21] Appl. No.: 262,311

[22] Filed: Oct. 25, 1988

[51] Int. Cl.[5] .............. B65G 1/04

[52] U.S. Cl. .............. 414/273; 414/635; 414/286; 187/9 R; 901/3; 364/478; 364/551.01; 364/562; 340/686; 340/689

[58] Field of Search .............. 414/273, 274, 275, 277, 414/281, 282, 283, 284, 285, 286, 636, 629, 631, 632, 634, 635, 661; 901/3-5; 187/9 R, 9 E, 29.2; 340/686, 689; 364/478, 562, 551.01

[56] References Cited

U.S. PATENT DOCUMENTS

| | | | |
|---|---|---|---|
| 1,879,801 | 9/1932 | Graham et al. | |
| 3,266,158 | 8/1966 | Campbell | 33/139 |
| 3,536,209 | 10/1970 | Burch et al. | 414/275 |
| 3,542,161 | 11/1970 | Ulinski | 187/9 R |
| 3,799,057 | 3/1974 | Cassel | 414/273 X |
| 4,074,794 | 2/1978 | Scholl | 187/9 R |
| 4,108,282 | 8/1978 | Satoh et al. | 187/29 R |
| 4,122,957 | 10/1978 | Allen et al. | 340/21 X |
| 4,185,390 | 1/1980 | Tateishi | 33/139 |
| 4,411,582 | 10/1983 | Nakada | 414/636 |
| 4,509,127 | 4/1985 | Yuki et al. | 414/274 X |
| 4,511,974 | 4/1985 | Nakane et al. | 364/463 |
| 4,517,645 | 5/1985 | Yuki et al. | 364/424 |

FOREIGN PATENT DOCUMENTS

| | | | |
|---|---|---|---|
| 1163349 | 3/1984 | Canada | 414/273 |
| 2709640 | 9/1978 | Fed. Rep. of Germany | 187/9 R |
| 20263 | 2/1978 | Japan | 414/275 |

OTHER PUBLICATIONS

Toledo Instrument Co., brochure.
Marco Engineering, Inc. brochure for Orion Microprocessor-Controlled Shelf Level Selector.
Keltronic Elektronische Systeme GmbH brochure for Shelf-Level Selector EPHV.

*Primary Examiner*—Frank E. Werner
*Attorney, Agent, or Firm*—Sixbey, Firedman, Leedom & Ferguson

[57] ABSTRACT

A device for indicating the height of the fork of a fork lift truck relative to a home position is set forth. The device includes a controller which compares programmed store and retrieve heights for various shelves in a warehouse with the current height of the fork. A display visible to the operator includes a first display device which indicates the fork is adjacent a particular shelf and is within a predetermined range encompassing the store and retrieve heights of that shelf. A second display device indicates when the fork is at or within a predetermined range of the store or retrieve height for the shelf.

18 Claims, 3 Drawing Sheets

HEIGHT INDICATOR FOR A FORK LIFT TRUCK

TECHNICAL FIELD

The present invention relates to an industrial lift tuck such as a fork lift truck. More particularly, the present invention relates to a device for indicating to the operator the height of the fork relative to the shelves in a warehouse.

BACKGROUND OF THE INVENTION

Lift trucks are used extensively in storage areas such as warehouses. Goods are mounted on a pallets having a platform that is spaced from the floor a distance sufficient to introduce the forks to the lift truck beneath the platform. The pallets are adapted to be lifted and moved to locations where the goods are to be deposited.

In a typical warehouse where the goods are stored on shelves, the fork raises the goods to the "store height" of a selected shelf to deposit the goods on the shelf. The store height is the height to which the pallet is raised so the pallet can be moved over and lowered onto the shelf. To retrieve a pallet from a shelf, the fork is raised to a "retrieve height" of the selected shelf, the height at which the fork enters between the platform of the pallet and the shelf. The fork is inserted under the platform of the pallet, is raised to lift the pallet off the shelf, and is withdrawn from the shelf with the pallet resting on the fork. The store height is higher than the retrieve height by an amount sufficient to provide adequate clearance between the pallet and shelf as the pallet is moved into the storage position over the shelf. Four inches is a typical clearance.

Without a device for indicating the height of the fork relative to a selected shelf, the operator of the lift truck must visually determine when the fork is at the correct height relative to a selected shelf to store a pallet on or retrieve it from the shelf. This is very difficult because of the relatively small difference between the store and retrieve heights, the difficulty in distinguishing the distances involved with high shelves, and obstructions in the field of vision such as the mast of the truck or the load. Also, the consequences of misjudging the height can be severe. Where the fork is too high or too low relative to the retrieve position it may engage the goods or the shelf rather than the pallet. The fork may damage the goods, the shelf, or the pallet, or it may push the pallet and goods off the opposite side of the shelf. Where the fork is too high or too low relative to the store height, the goods on the pallet may be jammed into the shelf and the top of the goods may hit the shelf above the selected shelf. This may damage the goods or the shelf, or the goods may fall off the pallet onto the floor, the truck, or the operator.

To assist the operator in locating the fork accurately relative to the height of the shelf, systems have been proposed to provide the operator with an indicator showing the height of the fork relative to the shelf. The shelf height indicator also permits the operator to raise or lower the fork as the truck is being moved from one location to another so that the truck arrives at the shelf where the goods are to be picked up or deposited with the fork at the correct height. This reduces the time required to raise or lower the fork when the truck is at the desired shelf. The indicator also can be used as a safety device to warn the operator when the fork is too high and the fork or the goods thereon may strike equipment such as air ducts, water lines, or lights on the ceiling of the warehouse. Devices which assist the operator in locating the fork accurately with respect to each shelf must evaluate criteria in addition to the different store and retrieve heights of the shelves. The warehouse may be designed to store various different goods on unequally spaced shelves. The warehouse or warehouse complex also may have different storage areas with shelves that are spaced differently.

U.S. Pat. No. 4,122,957 to Allen et al. discloses a fork lift which senses reflectors 25 opposite each shelf. The sensors actuate a drive for potentiometer 32 on the fork lift. This actuates meter 36 to indicate to the operator the retrieve and store heights for each shelf. The shelf number may be tracked by tape 29 that is wound on reel 30 while the position of the fork relative to the selected shelf is determined by the position of the reflector. However, the reflectors must be located at each storage position along each shelf. This requires the reflectors to be continuous along the shelf if the number of storage positions is not restricted. Continuous reflectors are expensive to install and also require extensive maintenance because their location on the shelf faces exposes them to damage. Also, separate means for indicating the shelf number and the store and retrieve heights for each shelf represents added expense.

The patent to Scholl U.S. Pat. No. 4,074,794 discloses another shelf height determining device for a fork lift truck. In Scholl, an indicator for the operator determines the height of the fork relative to the shelf on an automatic system for controlling the operation of the fork to predetermined heights. Because the operator must read the height from a scale and correlate this height to the store or retrieve heights of a particular shelf, error is likely. Also, the system itself is automatic; the lift is not within the control of the operator. This is expensive and, in the event of a malfunction, often results in damages exceeding that in a system in which the operator is in control and can sense trouble and limit damage.

Ulinski, U.S. Pat. No. 3,542,161 discloses a fork lift height control in which the height of the fork is determined by a cable attached at one end to the fork or load carrying element and at the other end to an indicator. The Ulinski device requires the operator to read and interpret a specific height relative to the desired shelf height. With an automatic system, this is relatively expensive.

The Nakada patent, U.S. Pat. No. 4,411,582 shows a fork lift truck in which both the elevation and tilt of the fork are programmable and are controlled automatically.

Commercially available controls for fork lift trucks include, for example, a unit marketed by Toledo Instrument Company. This device uses a tilt indiCator for the mast which, through a series of lights, indicates when the mast is vertical, is tilted forward, or is tilted backward. A device marketed by Marco Engineering Inc. provides a method for programming the shelf height in a warehouse using a system that automatically controls the raising and lowering of the fork to the selected height.

SUMMARY OF THE INVENTION

Despite the proliferation of controls for the height of the fork in a fork lift truck, there is no simple, inexpensive system adapted to be retrofitted to existing trucks that enables the operator to position a load accurately with respect to the store and retrieve heights of different shelves in a warehouse. Accordingly, the objects of this invention are to provide such a system, particularly one that is readily programmable with respect to one or more warehouses or warehouse areas. When properly programmed, this system will permit the operator to use the truck in a normal manner and will clearly indicate when the lift is located properly relative to the store and retrieve heights of a selected shelf.

The control system in accordance with this invention includes an indicator mounted on a fork lift truck readily viewable by the operator. The indicator provides an indication of the number of the shelf opposite which the fork is located. Through a series of lights, the indicator indicates the position of the fork relative to the store and retrieve heights of that shelf, that is, whether the fork is at, above, or below the desired level. The device is programmable with respect to a specific warehouse or warehouses, and to different locations within a warehouse that have different shelf heights.

The height of the fork relative to the floor is determined by a rotation counter on a spring-biased, self take-up reel in which a tape or cable is coiled. The free end of the tape is connected to the fork and is drawn from or rewound on the reel as the fork is raised and lowered. Since the system is programmed using the same height determining device that is used in operation. the system is not adversely affected if the tape does not move in direct proportion to the height of the fork. Tape movement may not be directly proportional to fork height for various reasons: the changing radius of the tape on the coil causes a different amount of tape to be reeled or unreeled from the coil upon each rotation of the reel; and a mechanical advantage may vary the movement of the fork with respect to the drive mechanism movement. The system may also be provided with additional Control functions such as a nonphysical limit on the height of the mast and the load. This avoids interference with equipment on the ceiling of the warehouse and provides visual or audio indications that the fork or the load is at a height that may interfere with obstructions.

Various additional advantages and features of novelty which characterize the invention are further pointed out in the claims that follow. However, for a better understanding of the invention and its advantages, reference should be made to the accompanying drawings and descriptive matter which illustrate and describe a preferred embodiment of the invention.

DETAILED DESCRIPTION OF A PREFERRED EMBODIMENT

Figure 1:
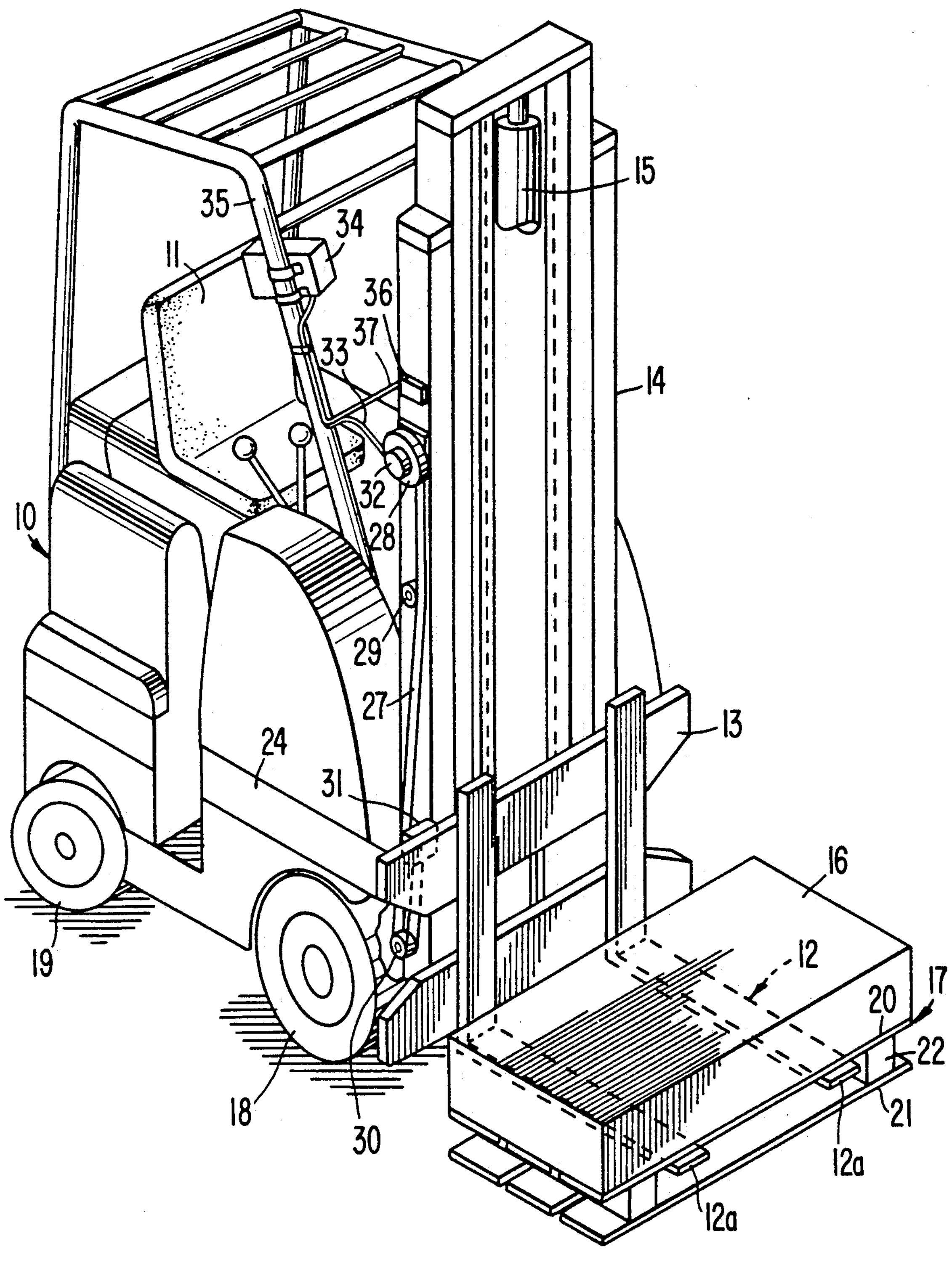
FIG. 1 is a perspective view of a fork lift truck embodying the present invention.

FIG. 1 illustrates fork lift truck 10 having seat 11 for the operator and fork 12 having a pair of tines 12*a*. Fork 12 is movable vertically by elevator 13 which is raised and lowered along tiltable mast 14 by hydraulic piston-cylinder device 15.

Figure 2:
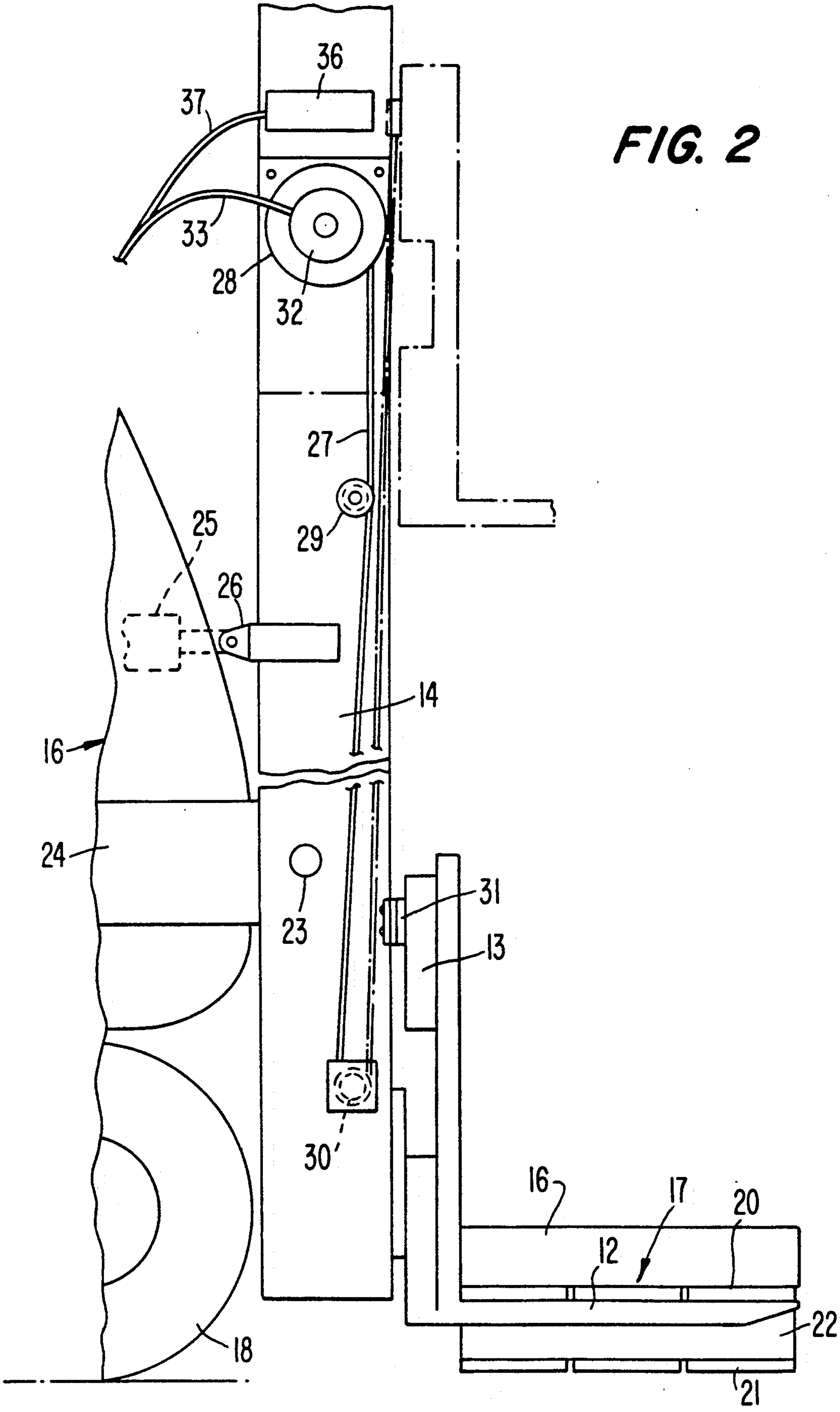
FIG. 2 is a fragmentary elevational view of the fork lift portion of the truck shown in FIG. 1.

Load 16 seated on pallet 17 is adapted to be picked up by fork 12 and raised to and deposited on a shelf in a warehouse. Truck 10 is moved on a pair of fixed wheels 18 and a pair of steerable wheels 19 controllable by the operator. Pallet 17 in the conventional manner may include an upper and a lower platform or base 20 and 21, respectively, separated by spacer 22. The lower platform rests on the floor or upper supporting surface. The upper platform, supports load 16 in spaced relation relative to the floor. Tines 12*a* of fork 12 enter between upper platform 20 and lower platform 21 in the spaces defined by spacer 22. Mast 14 is pivotably mounted on axis 23 to mounting member 24 of truck 10 as shown in FIG. 2. Mast 14 is tilted around axis 23 by hydraulic piston-cylinder device 25 which is connected from truck 10 to mast 14 by bracket 26.

The vertical position of fork 12 relative to its home or zero position such as the ground, is tracked by tape 27 wound on a spring-biased self take-up reel 28 mounted on mast 14. Tape 27 runs from reel 28 downwardly along mast 14, around pulley 29, and to reversing pulley 30 from which it extends upwardly. Its upwardly extending free end is connected to elevator 13 by bracket 31. Accordingly, when fork 12 is in its zero position on the ground, subsequent upward movement of fork 12 draws tape 27 from reel 28 to record tape movement from the zero position. Downward movement of fork 12 permits tape 27 to be drawn up as it is rewound on reel 28 to record movement of the tape toward the zero position. The amount of tape 27 drawn from or rewound on reel 28 is recorded by rotational counter 32 mounted on reel 28. Counter 32 produces output pulses in direct relation to the amount of rotation of the shaft of reel 28; e.g., one pulse or ten pulses for each degree of rotation. Rotational counter 32 is connected by lead 33 to an interfacing unit 34 secured in a position where it can be conveniently viewed by the operator such as on roll bar 35 of truck 10. Tilt indicator 36, which may include a conventional Murphy-type switch, is mounted on mast 14 adjacent reel 28 and is connected to control unit 34 by lead 37.

Figure 3:
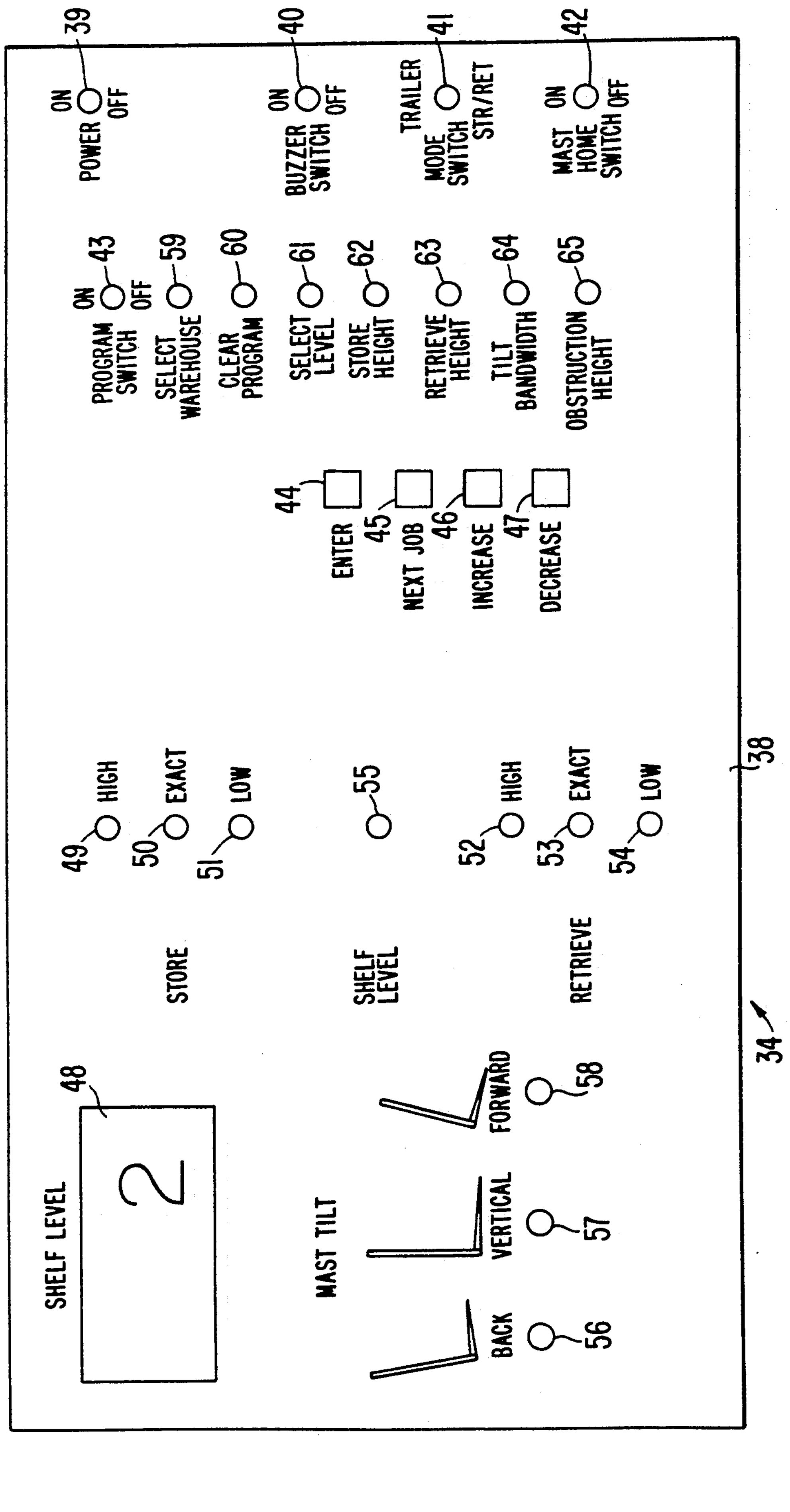
FIG. 3 is a face view of the control panel of the fork lift truck of FIG. 1.

With reference to FIG. 3, the interfacing unit 34 is used as a display as well as a programming device which includes display panel 38 visible to the operator on which various switches, buttons, and indicators are located. The interfacing unit 34 also includes a controller with memory and logic means described below. The switches on display panel 38 include on/off switch 39, buzzer switch 40, mode switch 41, "mast home" switch 42, and program switch 43. The buttons which increment the electronics include "enter" button 44, "next job" or "next program" button 45, increase button 46, and decrease button 47.

The indicators on panel 38 include numerical display 48 which displays the number of the shelf vertically from the home position when fork 12 is adjacent a particular shelf, and a series of lights. The lights include high, exact, and low lights 49, 50 and 51, respectively, associated with the store height for the shelf. Similar high, exact, and low lights 52, 53, and 54, respectively, are associated with the retrieve height of the shelf. Shelf level or mid range light 55 indicates when fork 12 is between the store and retrieve heights for that shelf. A series of three lights 56, 57, and 58 is associated with mast tilt indicator 36 and indicates when the mast is tilted backward, is vertical, or is tilted forward, respectively. The indicators also include a series of seven lights 59–65 associated with program switch 43 These lights indicate the different steps successively in a programming cycle.

"Select warehouse" light 59 indicates a selection of a particular warehouse or warehouse area that is identified by a code number appearing in numerical display 48. "Clear program" light 60 indicates the "clear program" step in the programming cycle. This step clears the memory of any data stored in the memory location at which the newly programmed data is to be stored. "Select levels" light 61 indicates the "select levels" step during which the number of a specific shelf is selected in numerical display 48. "Store height" light 62 and "retrieve height" light 63 relate to the selection of the store and retrieve heights, respectively, for that shelf. "Tilt bandwidth" light 64 relates to the amount of permitted forward and backward tilt of mast 14 at the height of the selected shelf. A greater amount of tilt is permitted at lower elevations than at higher elevations. "Obstruction height" light 65 indicates the selection of the obstruction height for the warehouse or warehouse area. This height is selected after the shelf heights have been selected. The obstruction height is higher than the highest programmed store height.

To distinguish the different lights and make them easier to read, the lights may be different colors. For example, the central lights 50, 53, and 57 of the store height, retrieve height, and mast tilt series as well as shelf level light 55 may be green while the other lights in these series are yellow. Lights 59-65 in the programming series may be red.

The sequence for programming the information for a particular warehouse system is described as follows, wherein it is understood that all of the operations for controlling the fork height and fork tilt are controlled manually by the fork lift truck operator making use of the normal fork lift operating systems, such as conventionally known including the hydraulic cylinders 15 and 25. Thus, the information programmed into the interfacing unit 34 is stored therein and is used to indicate to the operator when the fork is in certain programmed positions as operated by the operator when using the fork lift truck in warehousing operations. The operational mode of the height indicator is described in greater detail at a point further below.

In programming control unit 34 for a particular warehouse or warehouse area, mode switch 41 is placed in its STR-RET position and power switch 39 is turned on. At this time, the seven programming lights 59-65 are turned on. Mast 14 is then manually tilted back by the fork lift operator until mast backward light 56 turns on, after which the mast to its home or zero position, which is used as a calibration position, in which fork 12 rests on the ground. "Mast home" switch 42 is turned on to lock in the home position, and the seven programming lights 59-65 turn off.

Program switch 43 is then turned on. This turns on "select warehouse" light 59, and the number of the most recently used warehouse or warehouse area appears in numerical display 48. Using increase button 46 or decrease button 47, the number in display 48 can be incremented or decremented to the desired number—either a memory location that was not previously programmed or one that was previously used but is to be replaced. Upon selection of the code number to be used for the new warehouse or area, "enter" button 44 is depressed to store the warehouse number in the memory and "clear program" light 60 turns on. "Enter" button 44 is depressed again to clear the program currently stored in the selected memory location.

Upon depressing "next job" button 45, "select levels" light 61 turns on. Again, using increase button 46 or decrease button 47, the number in display 48 is adjusted to the desired shelf height number. Next, "enter" button 44 is again depressed to store the shelf height number in the memory and to advance the programming sequence to the next step, at which time the "store height" light 62 turns on. Mast 14 is then tilted by the operator to a vertical position illuminating green mast vertical light 57, and fork 12 is raised by the operator to the store height for the selected shelf. When "enter" button 44 is depressed, the store height is entered in the memory as a number of pulses of rotation counter 32 indicative of the degrees of rotation to reel 28. The program sequence is also advanced to the next step as "retrieve height" light 63 turns on. Fork 12 is then lowered by the operator to the desired retrieve height of the selected shelf. When "enter" button 44 is again depressed, the retrieve height is entered in the memory and "select level" light 61 turns on again. The steps of selecting the shelf height and setting the store and retrieve heights for the shelf are then repeated until the store and retrieve heights for all of the shelves in the warehouse or warehouse area have been entered.

The operator then depresses "next job" button 45, at which time "tilt bandwidth" light 64—which pertains to the amount of mast tilt—turns on. To set the tilt range, the operator uses increase button 46 or decrease button 47 to adjust the number appearing in display 48 to the desired number within the range of permitted tilt, such as zero to ten degrees. A tilt bandwidth is also entered in the memory when "enter" button 44 is depressed. Depressing "next job" button 45 advances the programming sequence to the next step, which is to set the obstruction height when "obstruction height" light 65 turns on. Fork 12 is then raised by the operator to the obstruction height which is higher than the highest entered store height and represents the height at which elevator 13 or fork 12 could strike an obstruction on the ceiling of the warehouse. "Enter" button 44 is depressed to enter the obstruction height in the memory. Depressing "next job" button 45 completes the programming sequence for this warehouse and turning off program switch 43 places the device in the operating mode.

A flow chart for the program mode described above is as follows:

Flow Chart: Program Mode

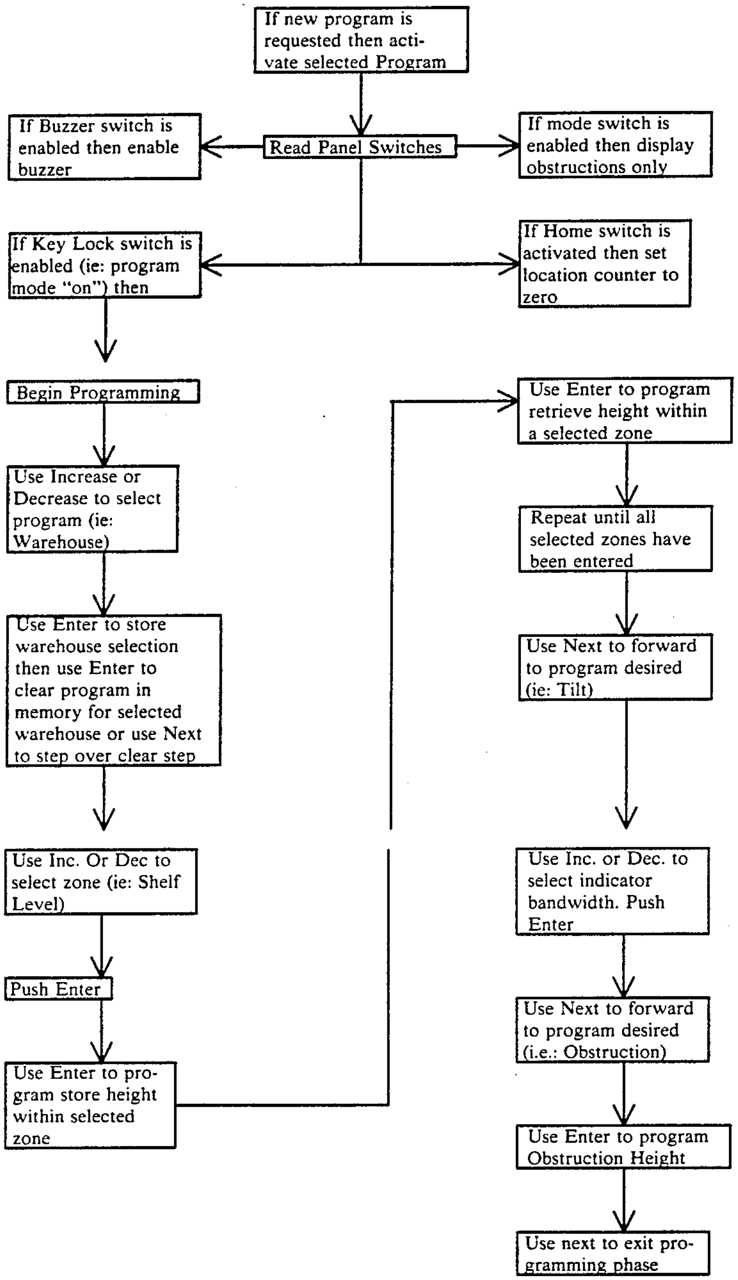

After programming a particular warehouse, truck 10 can be operated in that warehouse by the following steps. First mode switch 41 is switched to its STR/RET position. Next, power switch 39 is turned on and mast 14 is brought to its vertical position as indicated by mast vertical light 57 turning on. Next, mast 14 is lowered to its home position, and home position switch 42 is turned on to establish the home height.

Thereafter truck 10 is operated in the normal manner by the operator, who can refer to display panel 38 to determine when fork 12 is positioned properly relative to a selected shelf. As fork 12 is raised, the number of each shelf will appear in display 48. When fork 12 is within a preselected range encompassing the store and retrieve heights of that shelf, one of lights 49–55 for that shelf is on and the shelf number appears in display 48. With the high and the low lights indicating a distance of one inch above and below the exact store and retrieve heights as programmed by the operator, and with a preferably four inch difference between the store and retrieve heights, the range will be six inches from the high light for the store position to the low light for the retrieve position. The distance between the store and retrieve heights may be distance other than four inches. The operator can raise fork 12 to the desired level and, depending on whether a load is to be stored on the shelf or retrieved from the shell, center fork 12 at the exact store or retrieve height for that shelf as indicated by lights 50 or 53. Fork lift 10 can then be advanced to move fork 12 over the shelf, and fork 12 is either lowered from the store height to the retrieve height to deposit pallet 17 on the shelf or raised from the retrieve height to the store height to lift pallet 17 from the shelf, after which fork 12 is withdrawn.

The following flow chart indicates one sequence for the running or operational mode steps:

Flow Chart: Running Mode

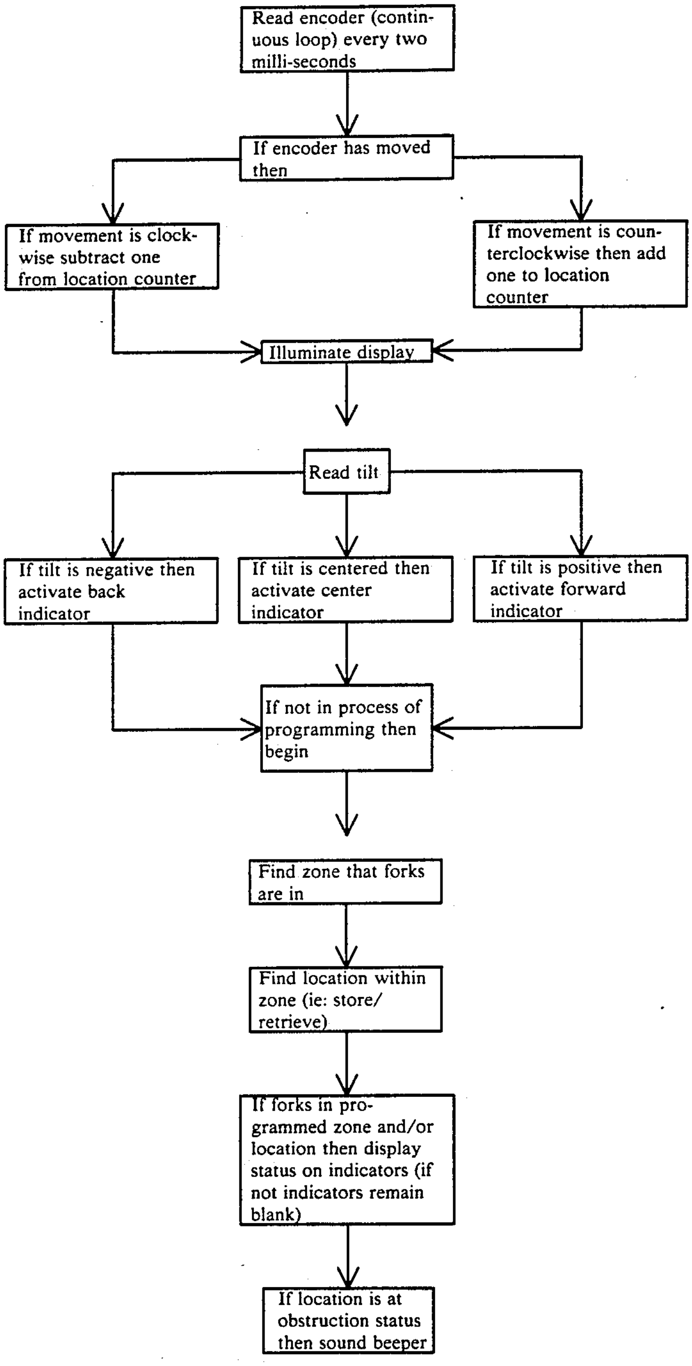

During operation of the truck, the tilt of mast 14 can be controlled to rest the load on fork 12 and to prevent the load from falling off as truck 10 is moved about, or to bring mast 14 to a vertical position despite a slight unevenness in the floor. The tilt orientation of mast 14 can be readily determined by the operator using lights 56, 57, and 58. Also, the tilt of mast 14 and fork 12 enables fork 12 to be level with respect to the shelving of the warehouse. This facilitates inserting fork 12 into the opening of pallet 17 between upper platform 20 and lower platform 21 and maintains fork 12 level.

Mode switch 41 can be turned to the trailer position for operation of the truck in a trailer such as where raising fork 12 would cause mast 14 to contact and punch a hole in or otherwise damage the roof of the trailer. In this position, raising mast 14 more that a predetermined amount above the reference or holding position will actuate a warning to the operator, such as a buzzer. The buzzer is also activated when mast 14 is raised to the obstruction height in the warehouse when load switch 42 is in the STR/RET position to indicate to the operator that mast 14 is in danger of contacting equipment on the ceiling. The buzzer may be disabled by buzzer switch 40, for example, when it is desired to operate a truck with the mast raised outside the predetermined ranges.

Numerous characteristics and advantages of the invention have been described in detail in the foregoing description with reference to the accompanying drawings. However, the disclosure is illustrative only and the invention is not limited to the precise illustrated embodiment. Various changes and modifications may be effected therein by one skilled in the art without departing from the scope or spirit of the invention.

We claim:

1. A height indicator for use on a fork lift truck of the type having a vertically positionable fork operatively associated therewith, said height indicator for indicating to an operator of the fork lift truck the position of the fork with respect to a particular shelf of a shelving system within a warehouse independently of a control system of the fork lift truck, said height indicator comprising:

programmable memory means for storing information regarding the vertical location of a plurality of shelves of a shelving system, said information including a storage height and a retrieve height for each of the plurality of shelves, a first sensing means for tracking the vertical position of a fork of a fork lift truck and sending signals representative of the sensed vertical position, comparing means that receives the signals from said sensing means for comparing the sensed vertical position of the fork to the stored information of the vertical location of the plurality of shelves stored in said programmable memory means, and a first display means that receives signals from said comparing means for indicating to the operator as the fork is controlled by the operator when the fork is positioned within a preselected vertical range of a selected shelf of the plurality of shelves, said preselected vertical range encompassing both the storage height and the retrieve height for the selected shelf, whereby the operator can load or unload between the fork and the shelves based on the indication of the display means within the predetermined range.

2. The height indicator of claim 1, wherein said first display means includes a first display portion that indicates the selected shelf of which the fork is within the preselected vertical range to the operator.

3. The height indicator of claim 2, wherein said first display means further includes a second display portion that indicates when the operator has positioned the fork at the exact location of one of the retrieve height and the storage height for the selected shelf as well as when the fork is within a first vertical range portion defined by a lower location a predetermined distance below and an upper location a predetermined distance above the one of the retrieve height and storage height for the selected shelf.

4. The height indicator of claim 3, wherein said first display means further includes a third display portion that indicates when the operator has positioned the fork at the exact location of the other of the retrieve height and the storage height for the selected shelf as well as when the fork is within a second vertical range portion defined by a lower location a predetermined distance below and an upper location a predetermined distance above the other of the retrieve height and storage height for the selected shelf, said preselected vertical range defined by the combination of the first and second vertical range portions such that the first display portion indicates the selected shelf while the fork is positioned between the upper location of the storage height and the lower location of the retrieve height.

5. The height indicator of claim 4, wherein said first display portion displays a given number or character representative of the selected shelf of the plurality of shelves within a particular warehouse system.

6. The height indicator of claim 4, wherein the second and third display portions are each comprised of a series of lights with each display portion including one light for indicating when the fork is in the exact location, one light for indicating when the fork is in a position a predetermined distance below the exact location, and one light for indicating when the fork is in a position a predetermined distance above the exact location.

7. The height indicator of claim 1, wherein said first sensing means comprises a self take-up reel mountable to a mast of a fork lift truck on which the fork is vertically movable, a tape wound on said reel, means for connecting a free end of said tape to the fork for moving therewith on the mast and for unwinding said tape from and rewinding the tape on said reel, and means for generating pulses for each predetermined increment of angular displacement of said reel which are sent to said comparing means.

8. The height indicator of claim 1, further comprising a second sensing means for detecting the tilt orientation of the fork as controlled by the fork lift truck operator and for sending signals to said comparing means, wherein said comparing means compares the sensed tilt to a programmed tilt band width stored in said programmable memory means for the selected shelf, and a second display means for indicating when the fork is within the programmed tilt band width.

9. The height indicator of claim 8, wherein the second display means comprises a series of indicators, including one for indicating that the fork is level, one for indicating a rearward tilt, and one for indicating a forward tilt.

10. The height indicator of claim 1, further including a warning means that informs the operator if the fork is raised to a position above a selected obstruction height, said obstruction height also stored within the programmable memory means.

11. A fork life truck having a vertically positionable fork movably mounted to a mast of the fork lift truck, said fork lift truck including a height indicator for indicating to an operator of the fork lift truck the position of said fork with respect to a particular shelf of a shelving system within a warehouse independently of a control system of the fork lift truck, said height indicator comprising:

programmable memory means for storing information regarding the vertical location of a plurality of shelves of a shelving system, said information including a storage height and a retrieve height for each of the plurality of shelves;

a first sensing means for tracking the vertical position of said fork of said fork lift truck and sending signals representative of the sensed vertical position, setting means for programming said programmable memory means, said setting means including a home position switch which when activated stores the position of the fork at that time in the programmable memory means as a reference position, comparing means that receives the signals from said sensing means for comparing the sensed vertical position of the fork to the stored information of the vertical location of the plurality of shelves stored in said programmable memory means, and a first display means that receives signals from said comparing means for indicating to the operator as the fork is controlled by the operator when the fork is positioned within a preselected vertical range of a selected shelf of the plurality of shelves, said preselected vertical range encompassing both the storage height and the retrieve height for the selected shelf, whereby the operator can load or unload between the fork and the shelves based on the indication of the display means within the predetermined range.

12. The fork lift truck of claim 1, wherein said setting means further includes a program switch which selects a mode of the height indicator, the program switch having a position for a programmable mode wherein the height indicator can be programmed according to the specifications of a selected warehouse, and an operational mode wherein the height indicator is used as a display device for indicating the fork position to the fork lift truck operator.

13. The height indicator of claim 11, wherein said first display means includes a first display portion that indicates the selected shelf of which the fork is within the preselected vertical range to the operator.

14. The height indicator of claim 13, wherein said first display means further includes a second display portion that indicates when the operator has positioned the fork at the exact location of one of the retrieve height and the storage height for the selected shelf as well as when the fork is within a first vertical range portion defined by a lower location a predetermined distance below and an upper location a predetermined distance above the one of the retrieve height and storage height for the selected shelf.

15. The height indicator of claim 14, wherein said first display means further includes a third display portion that indicates when the operator has positioned the fork at the exact location of the other of the retrieve height and the storage height for the selected shelf as well as when the fork is within a second vertical range portion defined by a lower location a predetermined distance below and an upper location a predetermined distance above the other of the retrieve height and storage height for the selected shelf, said preselected vertical range defined by the combination of the first and second vertical range portions such that the first display portion indicates the selected shelf while the fork is positioned between the upper location of the storage height and the lower location of the retrieve height.

16. The height indicator of claim 11, wherein said first sensing means comprises a self take-up reel mountable to said mast of said fork lift truck on which the fork is vertically movable, a tape wound on said reel, means connecting a free end of said tape to the fork for moving therewith on the mast and for unwinding said tape from and rewinding the tape on said reel, and means for generating pulses for each predetermined increment of angular displacement of said reel which are sent to said comparing means.

17. The height indicator of claim 11, further comprising a second sensing means for detecting the tilt orientation of the fork as controlled by the fork lift truck operator and for sending signals to said comparing means, wherein said comparing means compares the sensed tilt to a programmed tilt band width stored in said programmable memory means for the selected shelf, and a second display means for indicating when the fork is within the programmed tilt band width, wherein the second display means comprises a series of indicators, including one for indicating that the fork is level, one for indicating a rearward tilt, and one for indicating a forward tilt.

18. The height indicator of claim 11, further including a warning means that informs the operator if the fork is raised to a position above a selected obstruction height, said obstruction height also stored within the programmable memory means, wherein said setting means further includes an obstruction height switch which when activated stores the position of the fork at that time as the obstruction height.

* * * * *